UNITED STATES PATENT OFFICE.

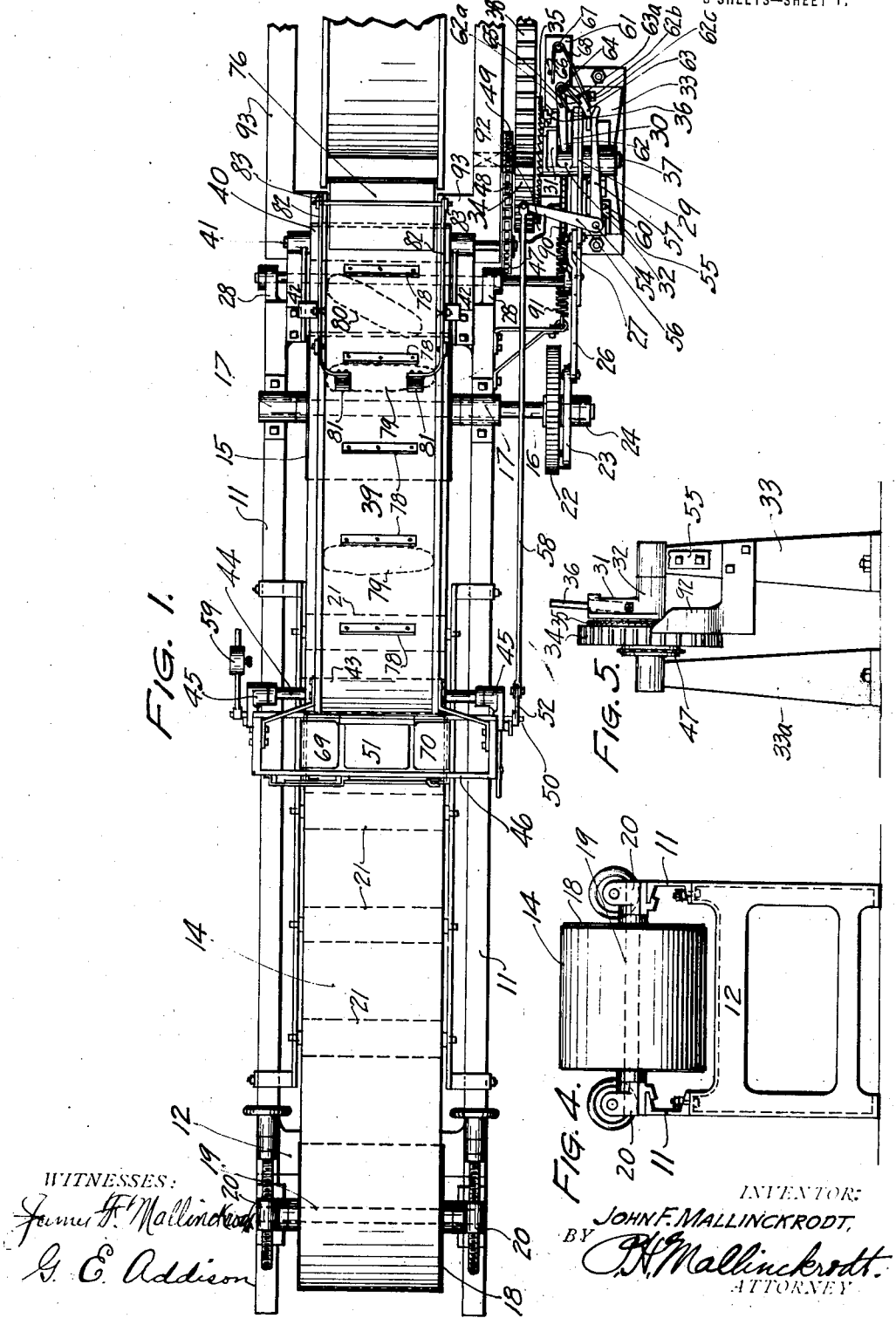

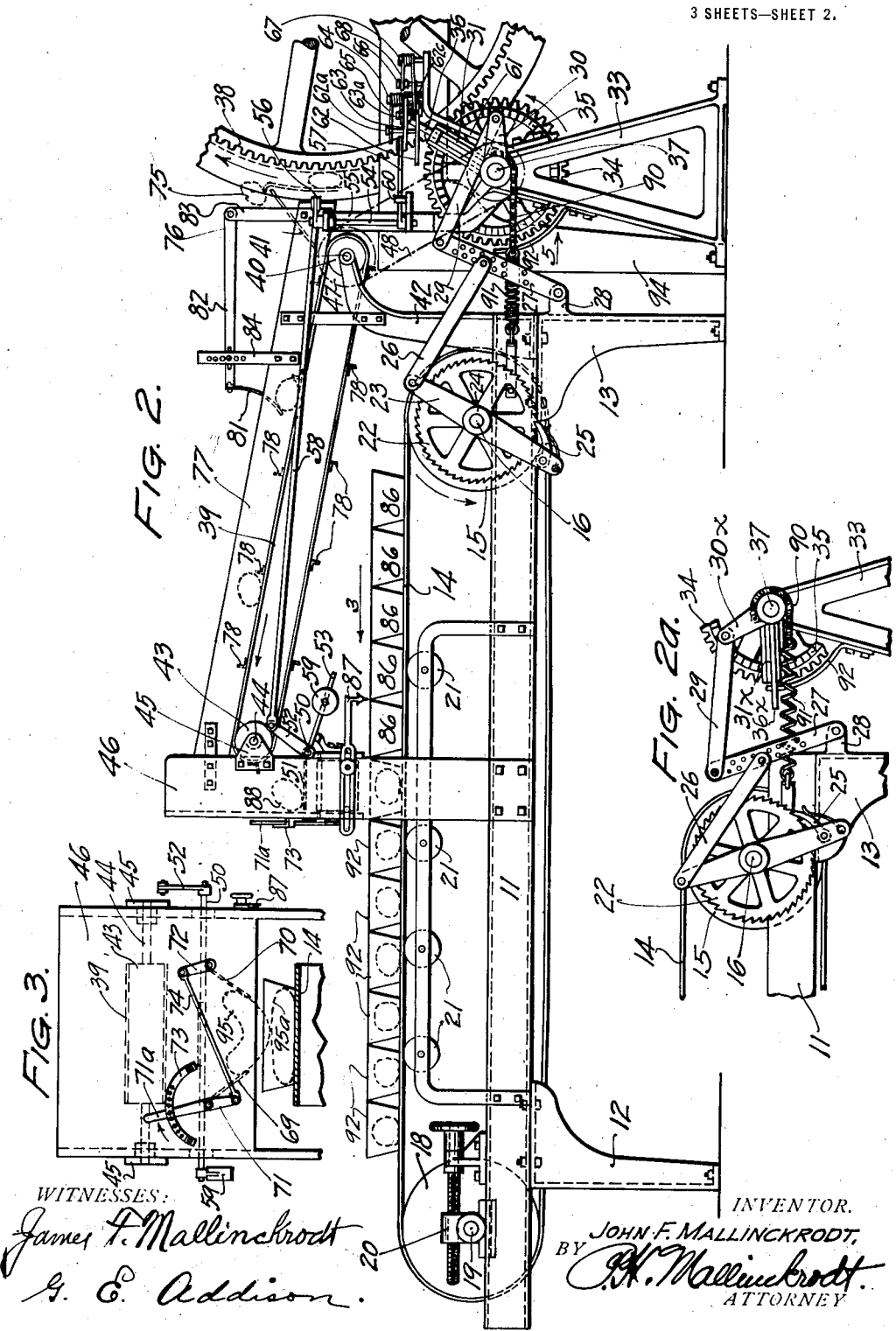

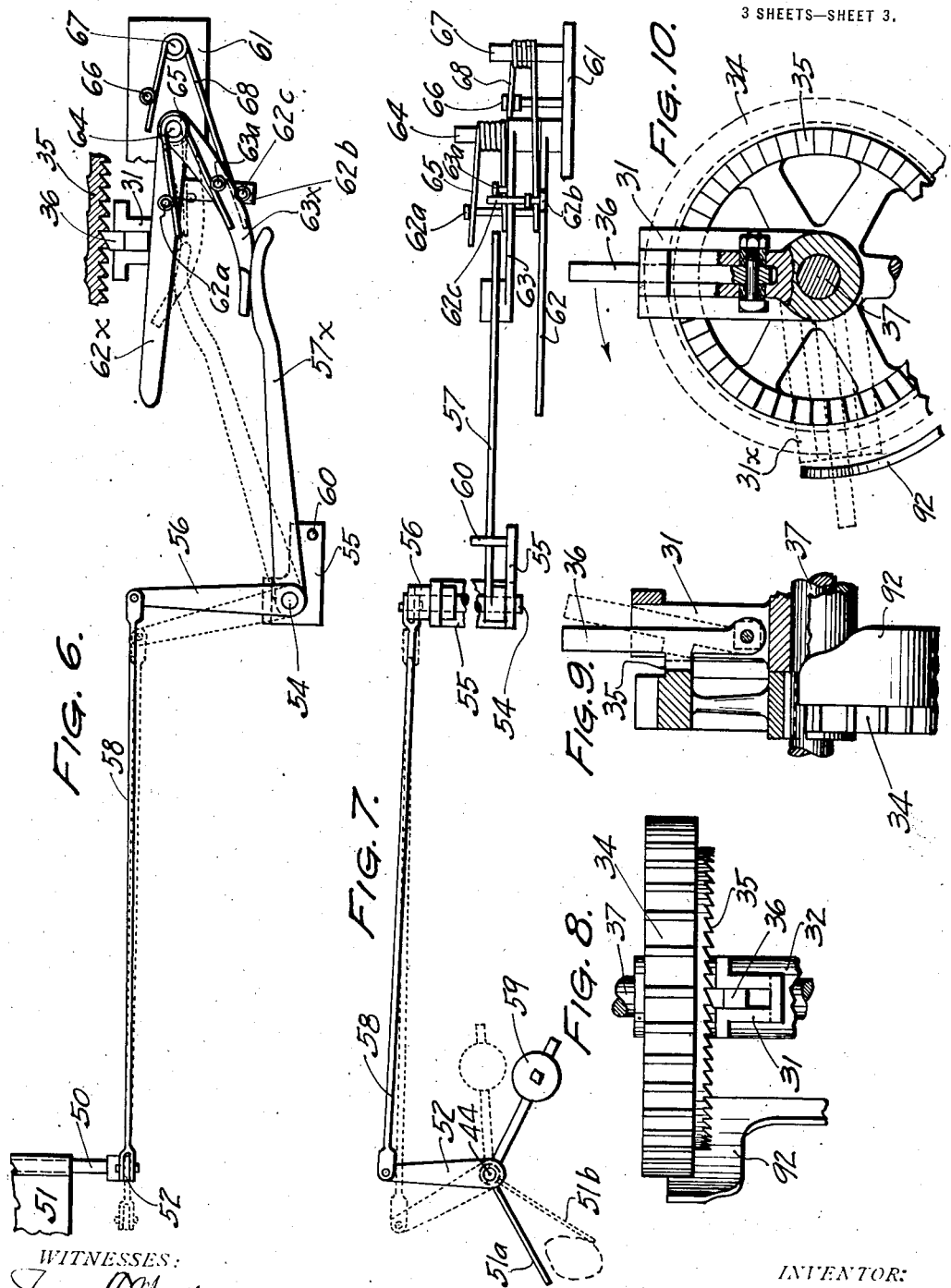

JOHN F. MALLINCKRODT, OF SALT LAKE CITY, UTAH.

PAN-FILLING MACHINE.

1,312,640.      Specification of Letters Patent.      Patented Aug. 12, 1919.

Application filed September 7, 1915. Serial No. 49,281.

*To all whom it may concern:*

Be it known that I, JOHN F. MALLINCKRODT, a citizen of the United States, and a resident of Salt Lake City, in the county of Salt Lake and State of Utah, have invented a certain new and useful Pan-Filling Machine, of which the following, together with the accompanying drawings, constitutes a full, clear, and exact specification, which will enable others skilled in the art of machine designing to make and use the same.

This invention relates to a machine for filling the bread pans in a bakery, and my objects are:—

First. To provide a machine which shall receive the rolls of dough as they come from the usual molding machine and shall deposit them in the baking pans ready for the oven.

Second. To require no human attendance, except for keeping a general supervision over one or more machines and to keep each machine supplied with empty pans and to remove the pans after they have been filled.

Third. To provide a machine which shall be simple in construction and reliable in its operation and not likely to get out of order so that it can be kept in good running condition by the ordinary bakery help.

In attaining my objects I provide two belt conveyers, one of which is set above the other.

The upper conveyer is in continual motion and receives the rolls of dough in the irregular order as they are discharged by the molding machine. The lower, or pan, conveyer has only an intermittent motion which is controlled by the rolls of dough as they are discharged by the upper conveyer. The pans are carried underneath a chute into which the upper conveyer discharges and on the inside of the chute is a vane or blade which is struck by the falling roll of dough from the upper conveyer and thereby moved to actuate an exterior mechanism which operates a clutch connected with a constantly running driving shaft and causes the pan conveyer to move ahead a distance equal to the width of one pan, or a fractional width of one pan in cases where two or more loaves are baked in the same pan.

The various features upon which protection is desired, are collectively grouped in the appended claims.

In the drawings:—

Figure 1 represents a plan view of the machine;

Fig. 2, a side elevation thereof;

Fig. 2ª, a fragmentary view of Fig. 2 showing an alternate position of some of the parts;

Fig. 3, an elevation of a part of the machine viewed in the direction of the arrow (3) in Fig. 2;

Fig. 4, an end elevation of the rear portion of the machine;

Fig. 5, an elevation of a minor part viewed in the direction of the arrow (5) in Fig. 2;

Fig. 6, an enlarged detailed view of the clutch actuating mechanism in an alternate position;

Fig. 7, a side elevation corresponding to Fig. 6; and,

Figs. 8, 9 and 10, fragmentary views drawn to an enlarged scale and showing minor parts in detail.

Throughout the different views, similar parts are designated by similar numerals.

Referring to the drawings, which represent merely one embodiment of my invention, the frame of the machine is made up of the side beams (11), having any suitable cross section though preferably made of rolled steel, and which may be supported by the rigidly connected leg castings (12) and (13). The belt conveyer (14) is constructed in the usual manner, (15) being the head drum mounted on the shaft (16) which is carried in the bearings (17) rigidly fastened to the beams (11). The foot drum (18) is mounted on the shaft (19) which is carried in the adjustable bearings (20); and at (21) are idler rollers for supporting the upper, or loaded side of the belt (14). Near one end the shaft (16) carries the rigidly mounted ratchet wheel (22) and by the side of the latter, the loosely mounted lever (23), held in place by the collar (24). At one extremity, the lever (23) has the pivoted spring-pressed pawl (25) and at the other extremity, it is pivoted to one end of the connecting rod (26). The other end of the rod (26) may be held by a removal pivot pin passing through any one of a suitable number of holes in the adjusting lever (27), the latter being pivoted at its lower end to the lug (28) projecting from the leg casting (13), and at its upper end the adjusting lever (27) is pivoted to a second connecting rod (29) the latter being also pivoted to the arm (30).

The arm (30) and the clutch-arm (31) are both integral with the hub (32) and therefore are also integral with each other, and the hub (32) is loosely mounted on the driving shaft (37), which is journaled in the floor stands (33) and (33ª).

The driving shaft (37) carries the rigidly mounted gear wheel (34) having the integral clutch ratchet (35) on one side of the rim thereof. The clutch arm (31) carries the pivoted pawl (36) adapted to be thrown into engagement with the clutch ratchet (35) in a manner which will presently be explained. In this instance the driving shaft (37) receives its motion through the gear (34) meshing with the large gear (38) belonging to a molding machine of a type in common use, but which is entirely separate from the present invention. If desired, the driving shaft (37) may receive its motion from any other suitable source.

The upper belt conveyer (39) has the head pulley (40) whose shaft (41) is journaled in the goose neck standards (42) mounted on the leg casting (13). The foot pulley (43) of the belt conveyer (39) has its shaft (44) journaled in the brackets (45) bolted to the chute (46), the sides of the latter extending downwardly and being bolted to the beams (11). The shaft (41) carries the rigidly mounted sprocket wheel (47) which is driven by the chain (48) passing around another sprocket wheel (49) fixed on the driving shaft (37). Somewhat below the foot pulley (43) and movably held in bearings attached to the chute (46) is the shaft (50) to which are fixed the blade (51), the lever arm (52) and the counterweight arm (53). At (54) is a short vertical shaft having its bearings in the horizontal lugs projecting from the standard (55) which at its lower end is bolted to the floor stand (33). The shaft (54) carries the lever arm (56) and the finger arm (57) both rigidly mounted thereon and the lever arm (56) being connected to the lever arm (52) by the rod (58). The gravity of the counterweight (59) is exerted to keep the related parts just described, in the normal position shown by the full lines in Fig. 1 and causing the finger arm (57) to be held against the stop (60) under a yielding pressure.

The floor stand (33) has bolted to it a bracket (61) which carries the folding arms (62) and (63) hinged on the common pivot pin (64); the spring (65) being coiled around the pin (64) and having its two ends extending outwardly, exerts its force between the pins (62ª) and (63ª) tending to keep the same apart, though normally the folding arms (62) and (63), as shown in Fig. 1, and by the full lines in Fig. 6, are under no pressure from the spring (65) the latter in this position having reached the limit of its spread and is under no tension. The arm (62) has a branch (62ᵇ) in which is fastened a pin (62ᶜ); and at (66) and (67) are two pins fastened in the bracket (61). The pin (67) carries the coiled spring (68) the two ends of which extend outwardly and bear against the pins (66) and (62ᶜ) thereby keeping the arm (63) in contact with the finger arm (57).

Inside the chute (46) are two pivoted blades (69) and (70) mounted on shafts having the arms (71) and (72) respectively, fixed thereon. The arm (71) has the handle (71ª) adapted to be moved along the quadrant (73) and to be adjustably secured thereto by means of a removable pin. The arms (71) and (72) are connected by the rod (74) at points on the opposite sides of a line joining the centers of their pivots, so that in moving the handle (71ª) back and forth the blades (69) and (70) will be moved mutually toward, or away from, each other as the case may be.

The various arrows in the drawings indicate the direction of motion of the surfaces near which they are placed. In using this machine the operator first places empty baking pans (86) on the belt conveyer (14) as shown in Fig. 2, setting one edge of the first empty pan (86) in accordance with the down pointing arrow of the adjustable gage (87) whose position is predetermined by the size of the loaf it is desired to bake. The next step is to set the driving shaft (37) in motion which in this case is accomplished by starting up the molding machine which has already been referred to herein, and which discharges the rolls of bread dough in the position indicated by the dotted line at (75) in Fig. 2. The rolls of dough usually measure from about one and one-half to two and one-half inches in diameter and about eight inches long, depending upon the size of the loaf to be baked. From the point of discharge of the molding machine, the dough rolls down the inclined plate (76) by gravity and onto the belt conveyer (39) which is provided with the trough sides (77) and the cleats (78). It is desirable for the reason that will appear further on, that the rolls of dough should be positioned on the belt conveyer in such a manner that the axes thereof will be very nearly perpendicular to the center line of the belt as shown by the dotted line at (79) in Fig. 1. As the rolls of dough seldom strike the belt in the proper position, more often being placed somewhat in the manner indicated by the dotted line at (80) in Fig. 1, I provide the springy metallic strips (81) fastened to the arms (82) pivoted to the standards (83) the front ends of the arms being adjustably held in the standards (84). The improperly placed roll of dough in passing under the strips (81) will be contacted at first only at one end, the resistance of the contacting strip (81) tending to retard this end of the roll of dough so that finally, in passing under both the strips (81) the dough will be brought against one of the cleats (78) as indicated at (79) in Figs. 1 and 2. As soon as the dough is discharged from the conveyer (39) it drops by gravity onto the blade (51) and strikes it (as indicated at (88) in Fig. 2) with sufficient force to immediately deflect the blade (51), first to about the position indicated at (51ª) in Fig. 7, and finally sliding off the blade when the latter is in about the position indicated at (51ᵇ) in Fig. 7. When the blade (51) has passed from the position shown in Fig. 1 to the position shown at (51ª) in Fig. 7, it will have caused the finger arm (57), through the intervening connections (50) (52) (58) etc., to pass to the position (57ˣ) in Fig. 6 and the finger arm (57) in turn acting on the folding arms (62) and (63) will cause these to assume the position (62ˣ) (63ˣ) in Fig. 6 the spring (65) providing the cushioning effect between the arm (62) and the arm (63) which is desirable to be exerted against the clutch pawl 36 when the latter is thrown into engagement with the clutch ratchet (35). In passing to the position (62ˣ) (63ˣ), the folding arms (62) (63) will push the clutch pawl (36) over far enough to be engaged by the teeth of the clutch ratchet (35) as shown in Fig. 6, and the latter, being in motion will immediately carry the parts (36), (31) and (30) with it until the latter have been brought to the position (36ˣ), (31ˣ) and (30ˣ) shown in Fig. 2ª and by the dotted lines in Fig. 10. At the same time the parts connected (29), (27), (26) and (23) will be moved forward to the position shown in Fig. 2ª. The movement of the double armed lever (23), when the parts described travel forward, through the pawl (25), causes the belt conveyer (14) to move forward a corresponding distance bringing the first of the pans (86) into the proper position to receive the falling roll of dough which has set in motion the train of mechanical elements as just described. It will be noticed that the distance traveled by the clutch pawl (36) at each stroke is constant but that the distance traveled by the conveyer belt at each stroke may be varied by the adjustment on arm (27). During the forward travel of the arm (30), the bicycle chain (90), one end of which being fastened to the hub (32), will be wound up thereon and will extend the spring (91) to the position shown in Fig. 2ª. Just before the clutch arm (31) has reached the position (31ˣ) (Fig. 10) the protruding portion of the clutch pawl (36) contacts the incline on the stationary cam (92) (shown in detail in Figs. 8, 9 and 10) and in traveling farther, follows the outline of the cam (92) and is thereby released from the clutch ratchet (35). Instantly upon the release of the clutch pawl (36), it and the parts (31), (30), (29) etc. are returned to the initial position shown in Fig. 2, through the influence of the tension in the spring (91). Thus, each roll of dough, as it falls through the chute (46) causes the movement of the pan to receive it, and the filled pans (92) are allowed to accumulate on the belt conveyer (14). It is the operator's duty to remove the filled pans and to keep the machine supplied with empty pans.

For the satisfactory operation of the machine, the roll of dough should be dropped through the chute (46) with its axis parallelling the lengthwise dimension of the pan which is at right angles to the center lines of the conveyer belts.

In order to guide the roll of dough into the pan, lengthwise, the blades (69) and (70) are set at the proper angle, by means of the lever (71ª), so that in falling into the pan, the roll of dough will have the crescent-like form shown at (95) in Fig. 3, allowing the middle portion thereof to contact the bottom of the pan first, the ends of the crescent immediately thereafter flopping down, leaving the roll of dough in the proper position in the pan as shown at (95ª) in Fig. 3.

At (93) and (94) are shown portions of the framework of the molding machine already referred to, in order to illustrate its relative position with regard to the framework of my pan filling machine.

It will be understood that while this machine has been primarily designed for the purpose specified it can be adapted for use for placing many different objects in many different kinds of receptacles, and further, while I have described an operable combination of parts, yet the details thereof may be varied considerably and they are not necessarily in the preferred form as shown.

Having fully described my invention, what I claim is:—

1. In a pan filling machine, the combination with a suitable framework, of a receiving conveyer; a second conveyer adapted to have pans placed thereon and so arranged that any objects carried by the said receiving conveyer may be discharged therefrom into the said pans while they are in position on the said second conveyer; and means, actuated by the passage of the said objects, for causing the said second conveyer to move through a certain predetermined space.

2. In a pan filling machine the combination with a suitable framework, of a receiving conveyer; a second conveyer adapted to have pans placed thereon and so arranged that any objects carried by the said receiving conveyer may be discharged therefrom into the said pans while they are in position on the said second conveyer; means, actuated by the passage of the said objects, for causing the said second conveyer to move through a certain predetermined space, and means for adjustably varying the length of the said space.

3. In a pan filling machine, the combination with a suitable framework, of a receiving conveyer adapted to carry rolls of dough and a second conveyer adapted to carry pans; means for guiding the said rolls of dough from the receiving conveyer into the said pans; means for automatically causing the said second conveyer to move the said pans in harmony with the discharge from the said receiving conveyer so that each pan shall be supplied with its intended contents.

4. In a pan filling machine, the combination with a suitable framework, of a conveyer adapted to carry rolls of dough; a second conveyer adapted to carry pans; a chute for guiding the rolls of dough, discharged by the said first conveyer, into the said pans; and means, actuated by the passage of the said roll of dough through the said chute, for causing the said second conveyer to move the said pans through spaces of predetermined length and means for adjustably varying the lengths of the said spaces, so that each consecutive pan shall receive its intended contents.

5. In a pan filling machine having a receiving conveyer adapted to carry rolls of dough and supported in a suitable framework, the combination therewith, of means, adjustably disposed and adapted to act upon the said rolls of dough in passing, in such a manner that the axes of the said rolls of dough will be caused to lie at approximately right angles to the center line of the said conveyer.

6. In a pan filling machine having a receiving conveyer, a guide chute, a pan conveyer and a suitable framework, the combination therewith, of a depressible member mounted in the said chute, and means for imparting an intermittent motion to the said pan conveyer, the combination being so arranged that the passage of a suitable object through the said guide chute shall cause the depression of the said depressible member, thereby controlling the motion of the said pan conveyer.

7. In a pan filling machine having a receiving conveyer and a pan conveyer suitably mounted with relation to each other, the combination therewith of a depressible member located between the said conveyers and means, suitably controlled by the said depressible member, for imparting an intermittent motion to the said pan conveyer.

8. In a pan filling machine having a receiving conveyer and a pan conveyer suitably mounted with relation to each other, the combination therewith of a mechanism, controlled by the intermittent passage of suitable objects from the said receiving conveyer to the said pan conveyer, whereby the said pan conveyer shall be caused to move through spaces of regular length in a correspondingly intermittent manner.

9. In a machine of the nature described, wherein one belt conveyer carrying suitable objects irregularly spaced thereon, discharges upon another belt conveyer, adapted to carry receptacles for receiving the said objects, the combination with the said conveyers and with a suitable supporting structure, of a pivoted blade adapted to be actuated by the said pans in passing from the first conveyer to the second conveyer, a shaft adapted to impart motion to the said conveyers; a clutch for engaging the shaft; and means for controlling the said clutch from the said pivoted blade for the purpose specified.

10. In a pan filling machine, the combination with a receiving conveyer, a pan conveyer located underneath thereof and a suitable supporting framework, of a chute leading from the said receiving conveyer to the said pan conveyer, and means located in the said chute for suitably guiding rolls of dough into pans carried by the said pan conveyer.

11. In a pan filling machine, the combination with an upper belt conveyer, a lower belt conveyer directly underneath thereof, the center lines of the said conveyers lying approximately in the same vertical plane, and a suitable supporting framework, of a chute leading from the upper conveyer to the lower conveyer, and means, suitably disposed in the said chute, for guiding rolls of dough discharged from the upper conveyer into pans carried by the lower conveyer.

12. In a pan filling machine, the combination with a suitable framework of a constant-motion conveyer and an intermittent-motion conveyer; a rotatable ratchet wheel for driving the intermittent-motion conveyer, an arm loosely journaled adjacent the said ratchet wheel, a pawl pivoted on the said arm and adapted to be engaged by the said ratchet, fingers actuated by the passage of objects from the constant-motion conveyer to the intermittent-motion conveyer; for throwing the said pawl into engagement with the said ratchet at the proper moment, a cam for disengaging the said pawl from the said ratchet at a predetermined point, and means for retracting the said arm to a certain initial position.

In testimony that I claim this invention as my own I have signed my name hereto in the presence of two subscribing witnesses.

JOHN F. MALLINCKRODT.

Witnesses:
L. L. RADMALL,
AINE CARLSON.